US006405199B1

(12) United States Patent
Carter et al.

(10) Patent No.: US 6,405,199 B1
(45) Date of Patent: Jun. 11, 2002

(54) METHOD AND APPARATUS FOR SEMANTIC TOKEN GENERATION BASED ON MARKED PHRASES IN A CONTENT STREAM

(75) Inventors: Stephen R. Carter, Spanish Fork; Delos C. Jensen, Orem, both of UT (US)

(73) Assignee: Novell, Inc., Provo, UT (US)

( * ) Notice: Subject to any disclaimer, the term of this patent is extended or adjusted under 35 U.S.C. 154(b) by 0 days.

(21) Appl. No.: 09/183,340

(22) Filed: Oct. 30, 1998

(51) Int. Cl.$^7$ .............................................. G06F 17/30
(52) U.S. Cl. .............................. 707/6; 707/500; 704/9; 704/4
(58) Field of Search ...................... 704/4, 9, 2, 220; 707/6, 500

(56) References Cited

U.S. PATENT DOCUMENTS

| | | | | |
|---|---|---|---|---|
| 5,724,594 A | * | 3/1998 | Pentheroudakis | 704/10 |
| 5,966,686 A | * | 10/1999 | Heidorn et al. | 704/9 |
| 5,991,713 A | * | 11/1999 | Unger et al. | 704/9 |
| 6,055,538 A | * | 4/2000 | Kessenich et al. | 707/1 |
| 6,108,619 A | * | 8/2000 | Carter et al. | 704/9 |
| 6,202,064 B1 | * | 3/2001 | Julliard | 704/9 |
| 6,236,991 B1 | * | 5/2001 | Frauenhofer et al. | 705/10 |
| 6,279,013 B1 | * | 8/2001 | LaMarca et al. | 379/100.07 |

OTHER PUBLICATIONS

*Applications of Functional Analysis and Operator Theory*, V. Hutson, J. S. Pym, 1980, table of contents, preface and index.

Latent Semantic Indexing is an Optimal Special Case of Multidimensional Scaling, Brian T. Bartell, Garrison W. Cottrell, Richard K. Belew, pp. 161–167, 1992; ACM 0–89791–524–0.

Improving Relevance Feedback in the Vector Space Model, Carol Lundquist, David A. Grossman, Ophir Frieder, 1997, pp. 16–23; ACM 0–89791–970–X.

A Multilevel Approach to Intelligent Information Filtering: Model, System, and Evaluation, J. Mostafa, S. Mukhopadhyay, W. Lam, M. Palakal, ACM Transactions on Information Systems, vol. 15, No. 4, Oct. 1997, pp. 368–399.

Capturing the State of Distributed Systems with XML, Rohit Khare and Adam Rifkin, Oct. 26, 1997, pp. 1–12.

Semantic Information Retrieval, Annelise Mark Pejtersen, pp. 90–92, Communications of the ACM, Apr. 1998/vol. 41. No. 4.

Unifying Heterogeneous Information Models, Narinder Singh, pp. 37–44, Communications of the ACM, May 1998/vol. 41, No. 5.

Platform for Internet Content Selection (PICS), Jan. 3, 1998, http://www.w3.org/pics/.

Intelligent Collaboration & Visualization, pp. 1–16.

* cited by examiner

Primary Examiner—Krisna Lim
(74) Attorney, Agent, or Firm—Dinsmore & Shohl LLP

(57) ABSTRACT

A content stream having a plurality of phrases is accessed. One or more phrases in the content stream are marked. For example, the phrases may be annotated and/or highlighted. The marked one or more phrases are extracted and are processed to determine semantic information. A token is created based on the semantic information. Such a token might be used as part of a method for assigning semantic characterization to a content stream. For example, the token could be associated with one or more profiles. At least a portion of the content stream could be represented in a semantic space corresponding to one or more profiles, and/or a semantic record might be instantiated from the profiles and compared with other semantic records.

18 Claims, 7 Drawing Sheets

US 6,405,199 B1

METHOD AND APPARATUS FOR SEMANTIC TOKEN GENERATION BASED ON MARKED PHRASES IN A CONTENT STREAM

TECHNICAL FIELD

The present invention relates generally to computer systems, and will be specifically disclosed as a method and apparatus for generating semantic tokens.

BACKGROUND OF THE INVENTION

The virtual explosion of technical advances in microelectronics, digital computers and software have changed the face of modem society. In fact, these technological advances have become so important and pervasive that this explosion is sometimes referred to as "the information revolution." Through telephone lines, cables, satellite communications and the like, information and resources are ever increasingly being accessed and shared.

Some attempts have been made for computers and software to interpret and understand the content of data. One such attempt is sometimes referred to as linguistic morphology, which in general terms involves applying computational language mechanisms to text. For instance, a two or three page report could be summarized to produce an outline of topics or an abstract using linguistic morphological techniques.

Another attempt for computers to understand content is to attaching a header or description along with a data, such as a PICS (Platform for Internet Content Selection). PICS are used to tag data so as to provide metadata about the content of the data. For instance, a PICS header can be used to indicate where content is violent, pornographic, or the like. PICS typically requires the cognitive input of a human to determine the content of the metadata.

Several search engines, often used with the Internet such as ALTAVISTA and EXCITE, provide relevancy determinations. For instance, when searching for information on the Internet, the search engine will list the Internet sites in order of apparent relevance, and in some instances provide a numerical indication as to the relevance. Typically, relevancy determinations is a function of the number or proximity of "hits" from the search query in the site.

SUMMARY OF THE INVENTION

One aspect of the present invention is the computer system. A network has a plurality of principals. A content stream in the network is associated with at least one principal. The content stream has a plurality of phrases. A marking tool has access to the content and is adapted to mark phrases in the content stream. A monitoring agent has access to the content stream and is operative to extract the markings. A token creation module is operative to create tokens based on the extracted markings.

Another aspect of the invention is a method in the computer system for generating tokens. A content stream having a plurality of phrases is accessed. One or more phrases in the content stream are marked. The marked one or more phrases are then extracted and processed to determine semantic information. A token(s) is created based on the semantic information.

Still other aspects of the present invention will become apparent to those skilled in the art from the following description of a preferred embodiment, which is by way of illustration, one of the best modes contemplated for carrying out the invention. As will be realized, the invention is capable of other different and obvious aspects, all without departing from the invention. Accordingly, the drawings and descriptions are illustrative in nature and not restrictive.

BRIEF DESCRIPTION OF THE DRAWINGS

The accompanying drawings, incorporated in and forming part of the specification, illustrate several aspects of the present invention and, together with their descriptions, serve to explain the principles of the invention. In the drawings.

Reference will now be made to the present preferred embodiment of the invention, an example of which is illustrated in the accompanying drawings, wherein like numerals indicate the same element throughout the views.

DETAILED DESCRIPTION

Often computers communicate between each other and share information, applications and/or services. Computers or computer systems are generally any device capable of processing data in accordance with one or more instructions. Examples of computers include personal computers, work stations, servers, mainframes, embedded systems, microprocessors, discrete logic systems, analog systems, and the like. Sometimes in the setting of interconnected computers, the various computers are referred to as nodes, which is a generic term referring to a point in a interconnected system.

Figure 1:
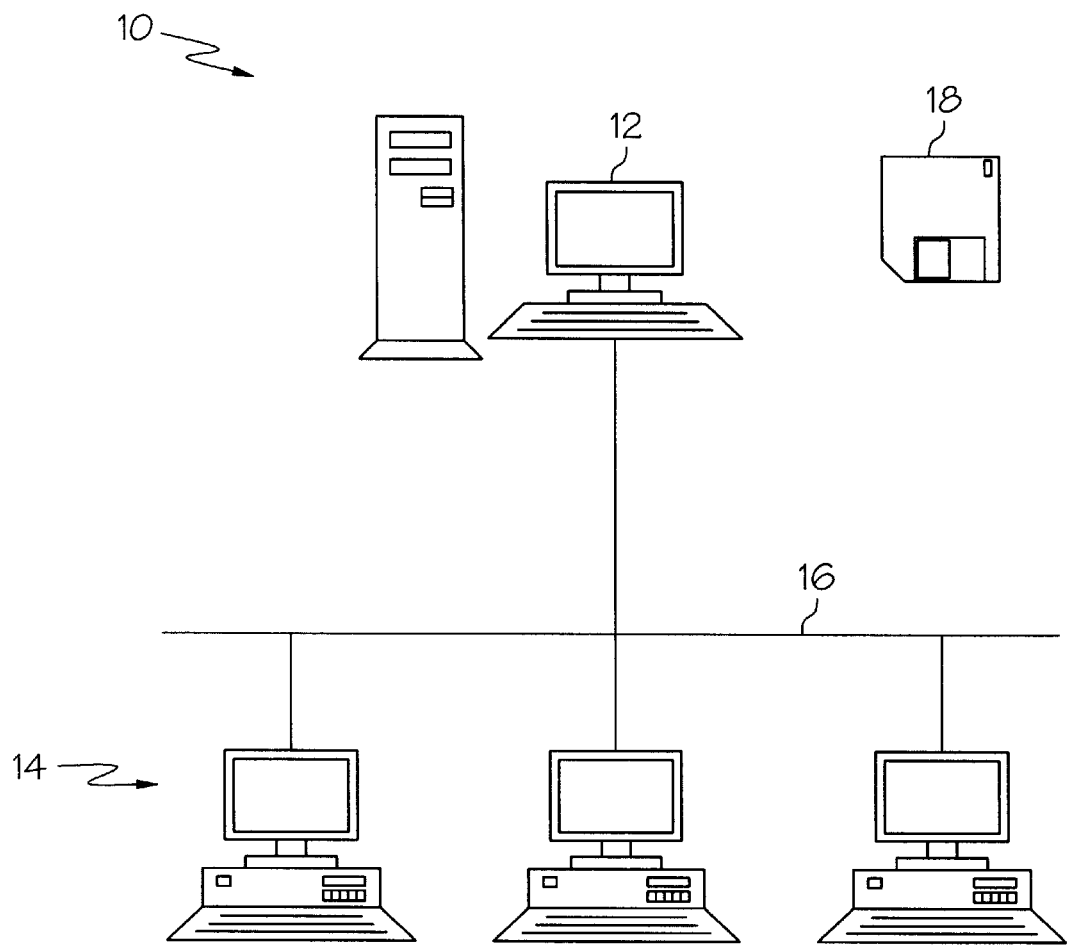
FIG. 1 illustrates an example of a computer network.

FIG. 1 illustrates a sample client/server network 10. As one with ordinary skill in the art will readily appreciate, a client/server network is only one type of network, and a variety of other configurations, such as local area networks, wide area networks, peer-to-peer connections, modem connections, the Internet, and the like, are also considered networks. In a client/server network, a plurality of nodes are interconnected such that the various nodes send and/or receive information to/from a server and one another. As shown here, a server node 12 is interconnected to a plurality of client nodes 14 using a connection 16 such as a token ring, Ethernet, telephone modem connection, radio or microwave connection, or the like.

A computer readable medium 18, shown here as a floppy diskette, holds information readable by a computer, such as programs, data, files, etc. As one with ordinary skill in the art will readily appreciate, computer readable media can take a variety of forms, including magnetic storage (such as hard disk drives, floppy diskettes, etc.), optical storage (such as laser discs, compact discs, etc.), electronic storage (such as random access memory "RAM", read only memory "ROM", programmable read only memory "PROM", etc.), and the like. Certain types of computer readable media, which are sometimes described as being nonvolatile, can retain data in the absence of power so that the information is available when power is restored.

Data is often transmitted and shared within or between computer systems. A source of data is sometimes referred to as a content stream. The form of the content stream can vary widely, including electric signals, sound waves, radiation (e.g. light, magnetic waves, etc.), computer readable media, bar codes, and the like. Likewise, the data in a content stream can vary widely, including text, graphics, sound, and the like. One typical example of a content stream is a communication, but is not limited to communications. For instance, content streams include signals over a network. Further examples of content streams include signals internal to a computer, signals to a peripheral device, parameters passed between functions, and the like. Typically, a content stream is associated with a principal, such as a communication coming or going from the principal. The size and complexity of a content stream can range widely, from a simple on/off pulse to an extensive collection of information.

Typically, but not always, a principal is associated with a content stream. A principal is a consumer or provider of information, capable of being uniquely identified (e.g., addressable). Some examples of principals include individuals, computers, programs, devices, and the like. Furthermore, a principal can be single consumer or a group of consumers. A principal's association with a content stream can vary widely, including being the source, recipient, intermediary, etc. of the content stream.

Figure 2:
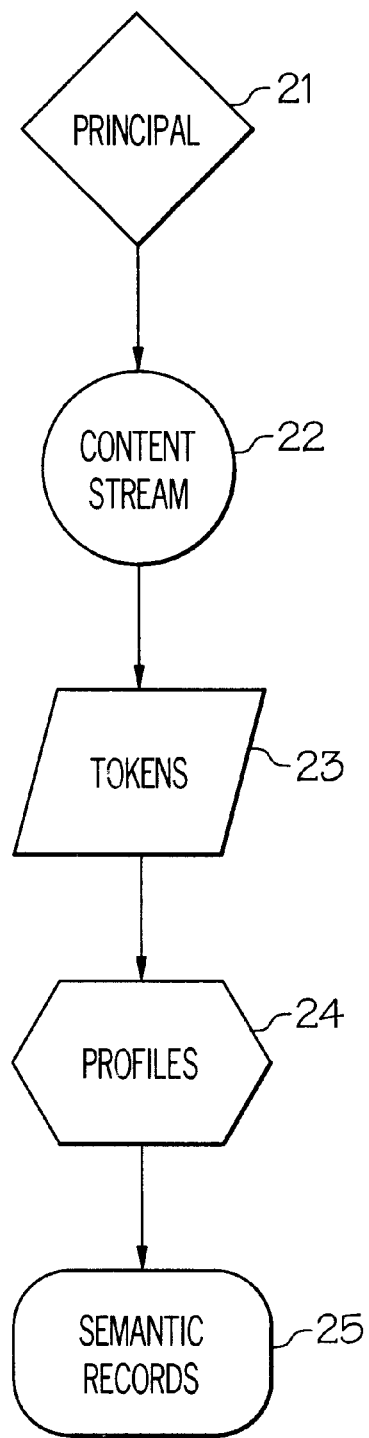
FIG. 2 depicts one possible correlation between a principal, content stream, tokens, profiles and semantic records.

FIG. 2 depicts one example of the invention. The principal 21 is associated with the content stream 22. Often, but not necessarily always, a content stream comprises one or more phrases. A phrase is a granule of the content stream. The size and extent of the granule can be configured based on the application. The nature of the phrase will typically depend of the type of data in the content stream. For instance, in a text-based content stream a phrase could be letter, a word, a sentence, or the entirety of the text. As a further example, in a raster content stream, a phrase could be a pixel or range of pixels in an image. Phrases can take a variety of formations, included nested, overlapped, or the like.

One or more tokens 23 are associated with the content stream 22. A token refers to metadata corresponding to a closed, bounded region of a content stream. Tokens can be associated with any portion of the content stream, including the entire content stream. For instance, a token could be information included with the content stream, such as a header similar to a PICS. As a further example, a token can correspond to one or more phrases in the content stream. The token correspondence is not exclusive to any given region of a content stream. For instance, many tokens can correspond to one region and one token can correspond to many regions.

One or more profiles 24 are each associated with one or more tokens 23. A profile is a collection of tokens. In one embodiment, a profile is a template for a semantic record which are instantiated from the profile. In another embodiment, the profile includes a predefined threshold before a corresponding semantic record will be instantiated. For instance, the threshold can be frequency based on associated tokens, which may be weighted or not for any given tokens. Preferably, a profile corresponds to a given concept or idea.

One or more semantic records 25 are each associated with one or more profiles 24 and one or more principals 21. A semantic record is an instance of a profile. In one preferred embodiment, the semantic record is described in a mathematical model, such as a topological vector space ("TVS"). One with ordinary skill in the art will recognize that a TVS is a concept in functional analysis. One reference that discusses this concept is *Applications of Functional Analysis and Operator Theory* by V. Hutson, which reference is hereby incorporated by reference. The axis definitions of the TVS are maintained in the profile from which the semantic record was instantiated. Preferably, the TVS acts as the context for a frequency function, and the semantic record will be destructed if a predetermined and configurable threshold of the frequency function is not satisfied.

Figure 3:
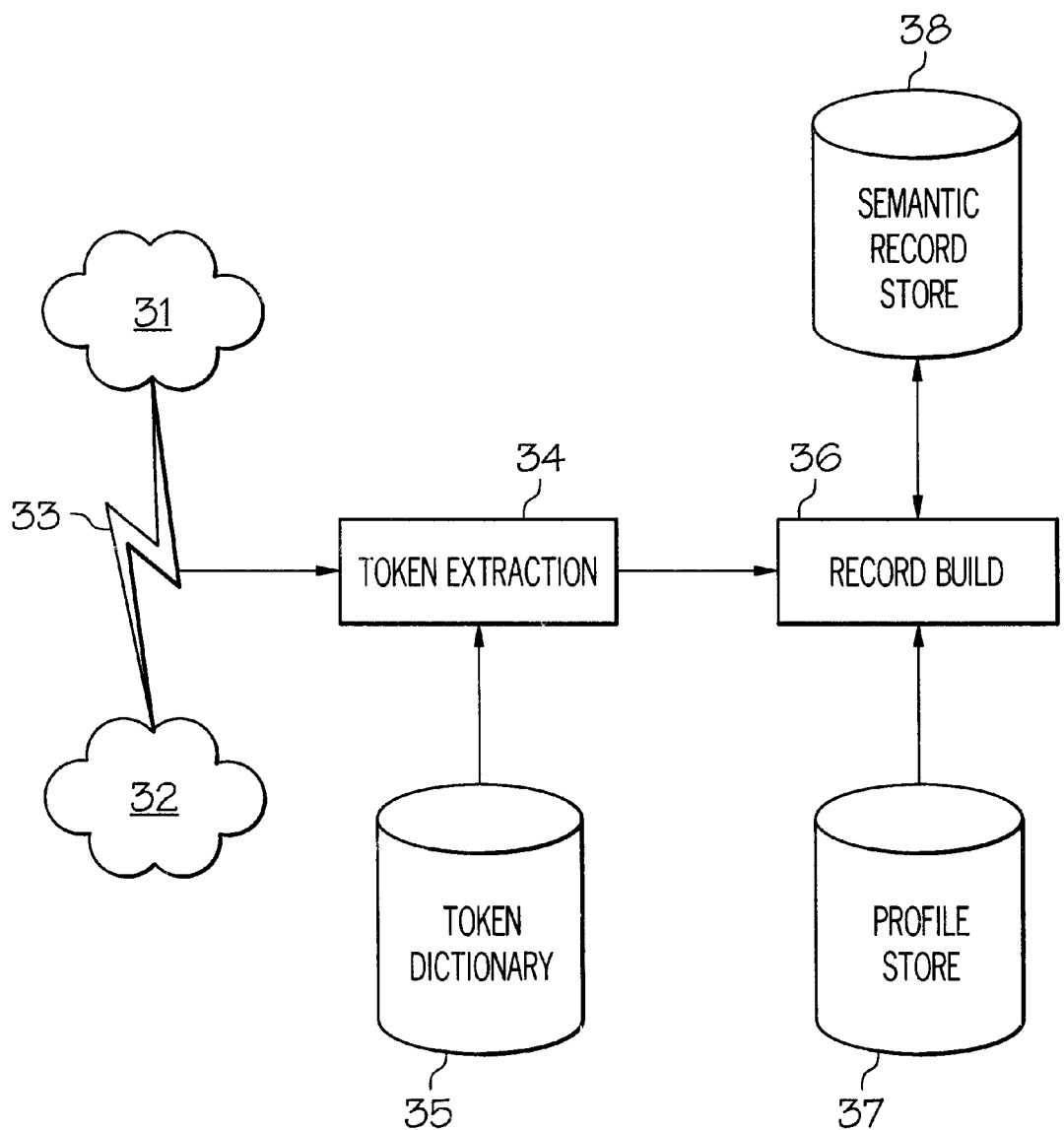
FIG. 3 depicts an example of a system for creating semantic records.

FIG. 3 depicts another example of the invention. The two clouds 31, 32 represent a network that has a common connection 33 through which a content stream can be accessed. A token extraction mechanism 34, such as a process or program having a series of instructions in a computer system, has access to the connection 33 and the content stream. The token extraction mechanism 34 extracts or determines tokens from the content stream. In this example, the content stream is parsed based on its phrases. The parsed phrases are then referenced in the token dictionary 35 to determine the corresponding tokens.

The token dictionary 35 is a collection of tokens. The token dictionary 35 can be a simple list of one or more tokens, or can contain additional information. For instance, in the present example the token dictionary 35 includes information for associating tokens with phrases and/or vice versa. In one embodiment, the token dictionary is stored a computer readable medium in the form of a database.

While token extraction and the token dictionary is not limited to text-based content streams, consider the following illustration of a portion of token dictionary which could be applied to a text-based content stream:

| Phrase | Token(s) |
|---|---|
| java | coffee, computer language, . . . |
| latte | coffee, . . . |
| espresso | coffee, . . . |
| skim | milk, . . . |
| cream | milk, . . . |
| milk | milk, . . . |

When the phrases "java", "latte" or "espresso" are parsed from the content stream, the token dictionary is referenced to determine that the token "coffee" is associated with the content stream. As such, one can determine that the principal associated with the content stream is referencing "coffee." Likewise, when the phrases "skim" or "cream" are parsed, one can determine that the associated principal is referencing "milk." As illustrated in the last entry, the phrase can be very similar to the associated token.

Phrase extraction can be literal (i.e. parsing the content stream directly) or interpretive (i.e. interpreting the content of the content stream). Some examples of interpretive phrase extraction include relevancy determinations (e.g. such as those found on Internet search engines such as ALTAVISTA, EXCITE, etc.), linguistic morphology, tagged content streams, and the like. For instance, using an interpretive phrase extraction, such as linguistic morphology, the word "cool" could be evaluated against the context in which it is used to determine whether the associated token should be "cold" or "excellent".

The extracted tokens are then passed to the record build mechanism 36, which could be embodied in a process, a program, or other forms. The record build mechanism 36 accesses the profile store 37, which contains a plurality of profiles. In the present example, the profile store is a database contained on a computer readable medium. The extracted tokens are compared with the profiles. Each profile comprises a plurality of associated tokens. Each extracted token may participate in the instantiation of multiple semantic records.

Preferably, each profile defines a semantic concept. For instance, a profile may correspond to "drinks", which profile could include the tokens "coffee", "milk", "soft drinks", etc. The profiles act as a class definition where the resulting semantic record is an instantiation of the corresponding class. The profiles are instantiated into semantic records based on the extracted tokens. Further, the semantic records are associated with the principal associated with the content stream from which the tokens were extracted. In one embodiment, the profiles additionally store a frequency threshold of tokens along with other qualifying criteria for the creation of, admission of tokens to, deletion of tokens from, or deletion/destruction of—one or more semantic records.

The instantiated profiles are stored in the semantic record store 38, which stores a plurality of semantic records. In one embodiment, the semantic record represents the content stream in a semantic space, such as a TVS. A semantic space is a representation of the domain of interest. The semantic space is modeled by a TVS such that the axis of the TVS span the domain of interest in some metric that can measure the position, direction, and distance between any two points in the TVS. For example, measuring how much a person likes milk requires us to develop a means and method to measure and quantify the "likes milk" metric to be placed on the "likes milk" axis of the TVS. Another example would be to represent "taste" in a TVS. In this case there could be at least three axis, "bitter," "sweet," and "salty." Extracting tokens describing the taste of a thing will yield semantic records that can be positioned in the TVS such that things that taste like "apples" will tend to clump together in the multi-axis space of the TVS. As such, each semantic record is a function of a principal, the associated content stream, and time. Each semantic record contains a variety of points within the TVS representing or characterizing the principal's activity within that semantic space. One reference that discusses mapping in a TVS is *Latent Semantic Indexing Is An Optimal Special Case Of Multidimensional Scaling* by Brian T. Bartell, Garrison W. Cottrell, and Richard K. Belew, which is hereby incorporated by reference.

Preferably, the semantic record store is dynamic. As time transpires and the content stream varies, new semantic records are added by the record build mechanism 36. Likewise, existing semantic records are updated and modified by the record build mechanism 36 based on the changing content stream associated with the principal. In other words, the cloud of points within the TVS can vary, thereby changing the strength, frequency, location, etc. of the principal within that semantic space. Preferably, after a period of time of a predefined threshold inactivity defined in the associated profile, a given semantic record can be destructed by the record build mechanism 36.

Figure 4:
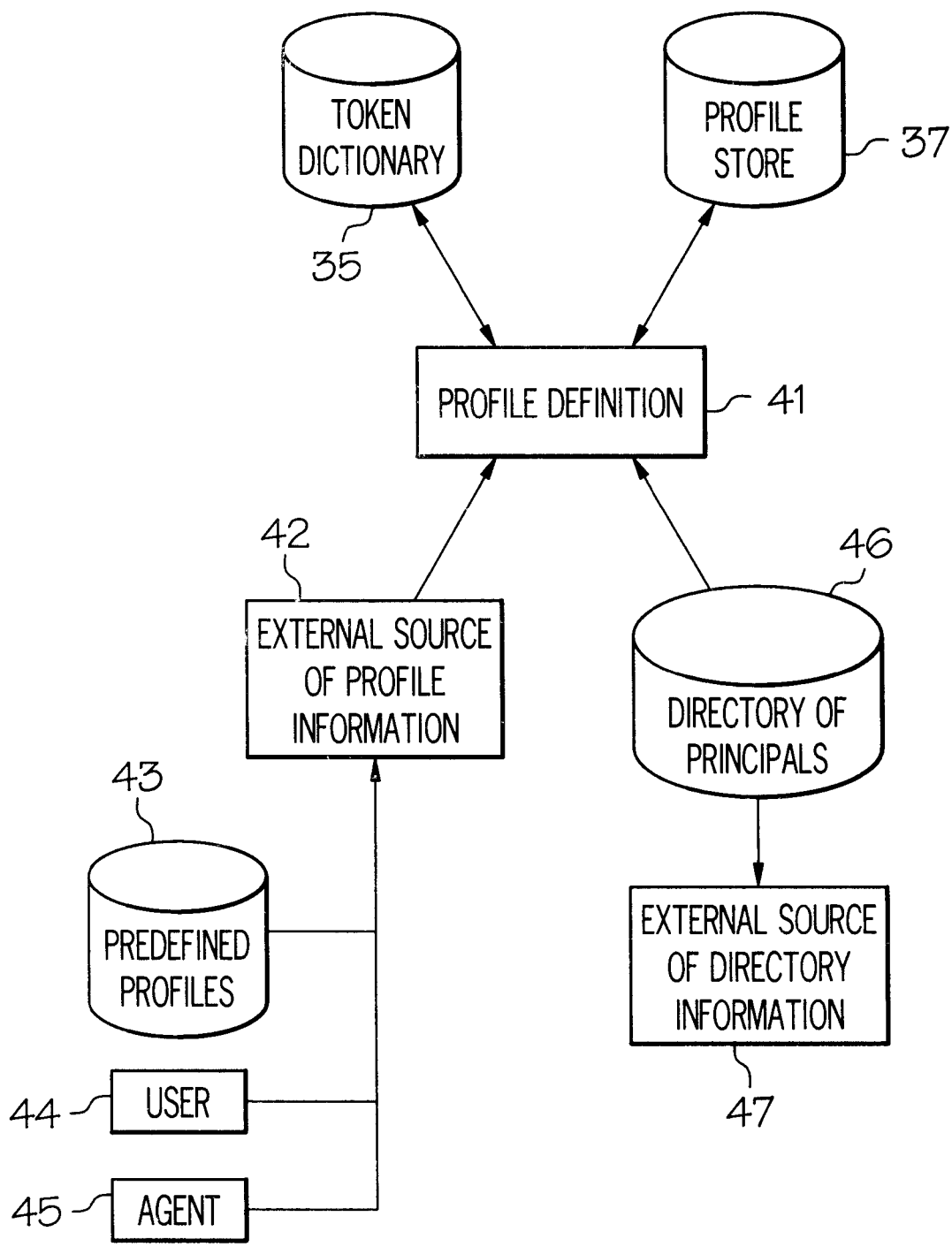
FIG. 4 depicts an example of a system for managing a token dictionary and profile store.

FIG. 4 depicts an example of a system for managing the token dictionary 35 and the profile store 37. Preferably, both the token dictionary 35 and the profile store 37 are editable and configurable. In this example, the profile definition mechanism 41 is the principal engine for such management. The profile definition mechanism 41 reads and writes to the token dictionary 35 and the profile store 37. Preferably, the profile definition mechanism 41 consolidates the information such that the definition of entries in the token dictionary 35 and the profile store 37 are normalized to each other.

Information about the various principals are retrieved from the directory of principals 46, such as a database, a distributed directory, an index, or the like. The directory of principals 46 is editable and updatable through he external source of directory information 47. The external source of profile information 42 interfaces with the profile definition mechanism 41 so as to update and modify the token dictionary 35 and the profile store 37. For instance, predefined profiles 43, user 44 input, agent 45 input, and the like can be used to modify the token dictionary 35 and the profile store 37.

Figure 5:
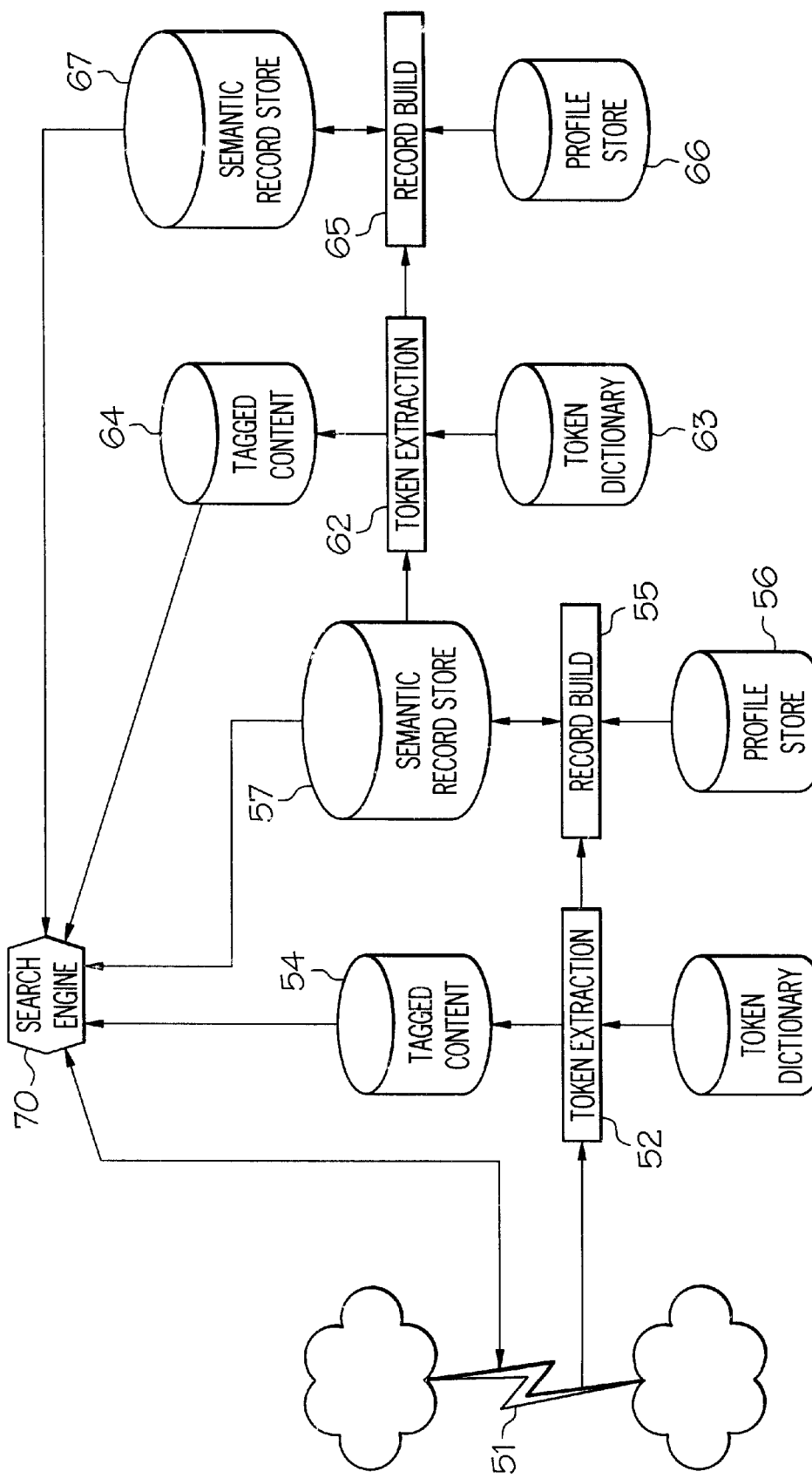
FIG. 5 depicts another example of a system for creating and searching semantic records.

FIG. 5 illustrates yet another example of the present invention. The connection 51 has access to a content stream. The token extraction mechanism 52 parses phrases from the content stream, which phrases are resolved to one or more tokens by referencing the token dictionary 53. The resolved phrases and tokens are stored as tagged content 54, which can be accessed by other mechanisms and processes. Preferably, the presence of a token can be mapped back to the associated phrase using the tagged content 54. The record build mechanism 55 receives the extracted tokens from the token extraction mechanism 52. The profile store 56 is accessed and where appropriate semantic records are instantiated from profiles. The semantic records are then stored in the semantic record store 57.

The search engine 70 allows the tagged content 54 and semantic record store 57 to be searched. Further, two or more semantic records can be compared to one another. For instance, for a given semantic space like a TVS, each profile with a defined mapping to that TVS may be represented as a scalar field or state function which evolves though time. The methods of functional analysis and operator theory can be applied to the state functions, and the results of such methods can be used to compare the various semantic spaces. For instance, semantic records could be compared to see if the principals are active in the same semantic neighborhood (i.e. near or far from one another), or whether the principals are converging or diverging from one another. Further, the search engine 70 may perform a search based on a request from another search engine 70.

The token extraction mechanism 62 operates to develop a semantic space of a semantic space. The token extraction mechanism 62 parses the semantic records in the store 57 into phrases, which are resolved to tokens in the token dictionary 63. The resolved phrases and tokens are stored as tagged content 64. The extracted tokens are passed to the record build mechanism 65, which accesses the profile store 66 to create semantic records, which are then stored in the semantic record store 67. The new semantic record can be viewed as the first derivative of the semantic records contained in the semantic record store 57. One with ordinary skill in the art will readily recognize that many higher derivatives could readily be created using this teaching.

Figure 6:
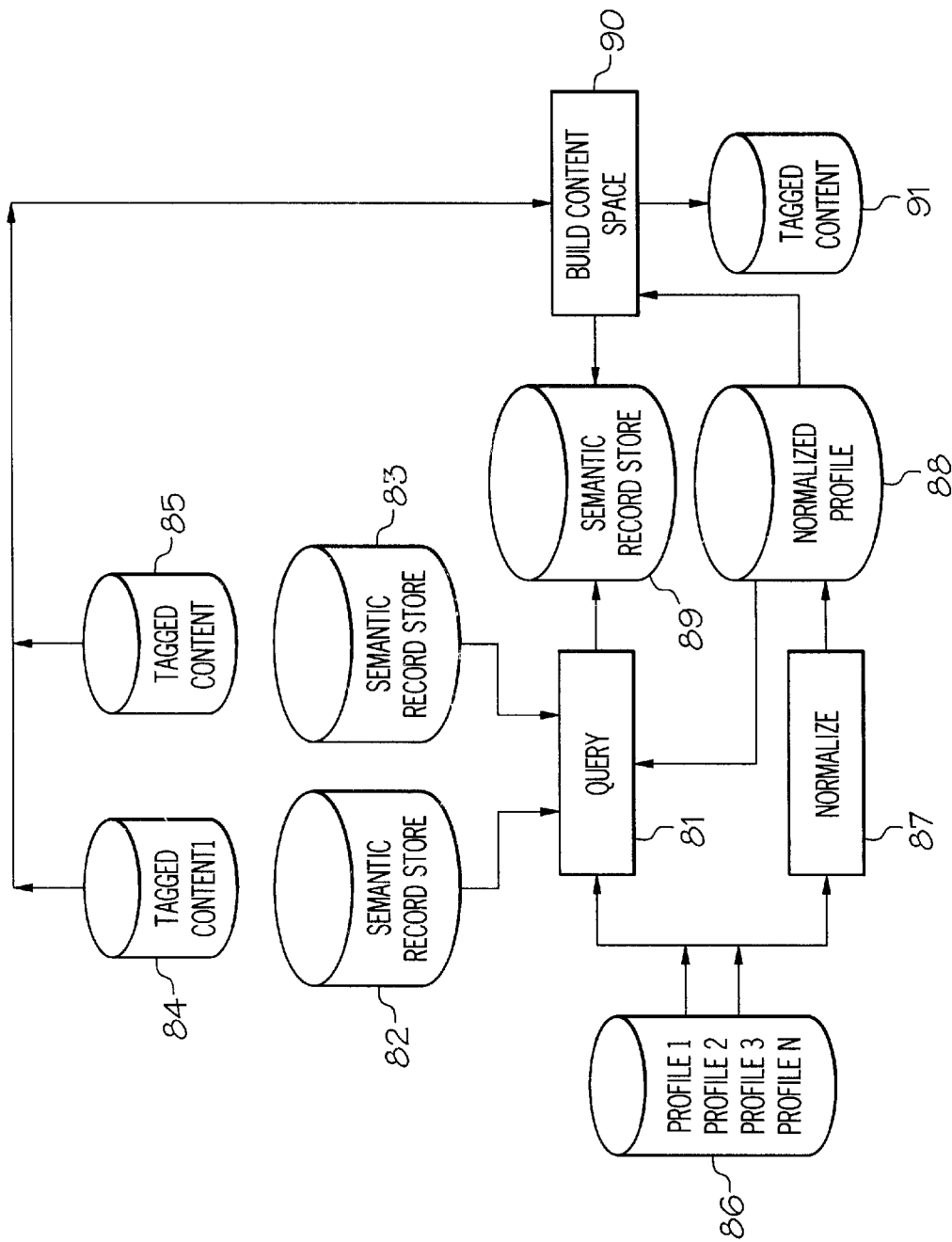
FIG. 6 depicts another example of a system for sending and normalizing semantic records.

FIG. 6 illustrates an embodiment of another aspect of the present invention. The query mechanism 81 uses a plurality of semantic record stores 82, 83 to access a plurality of semantic records. At issue is how to compare semantic records instantiated from different profiles. The normalize mechanism 87 receives from the profile store 86 information about the profiles, in this example Profile 1 and Profile 2. The normalize mechanism 87 defines a normalized profile 88 that allows the transformation from the original profiles to the normalized profile 88. The build content space mechanism 90 receives the tagged content 84, 85, and builds new semantic records using the normalized profile 88. The new semantic records are then stored in the semantic record store 89, which can be readily queried. In addition, the build content space mechanism 90 stores the tagged content 91.

Figure 7:
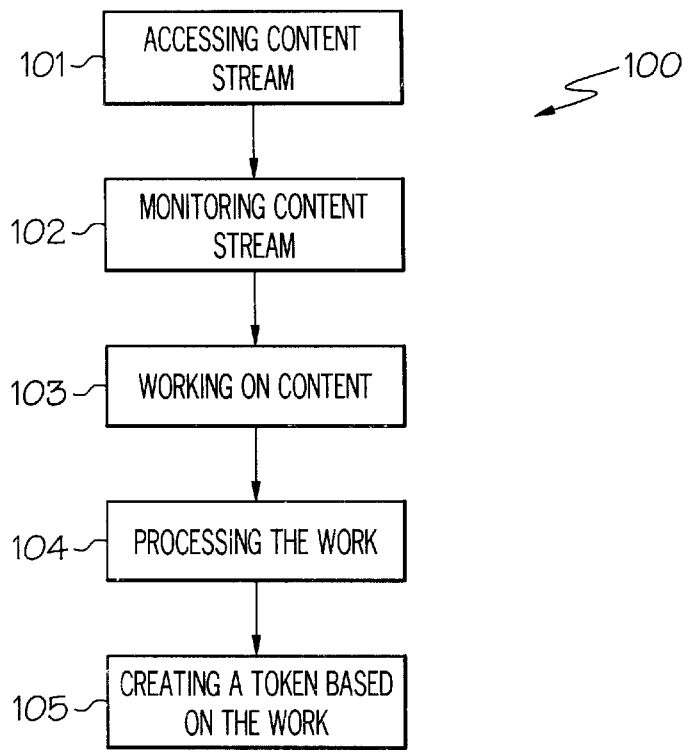
FIG. 7 depicts a flowchart of a method to generate tokens.

As discussed above, tokens can be generated and extracted in a variety of different ways. One such technique, which may be implemented independently or in combination of the foregoing teachings, involves attributing contextual semantic information to content when work is practiced on the content. The work is monitored, codified, and analyzed to generate one or more tokens based on the work itself. One example of such a technique is the method 100 illustrated in FIG. 7. In steps 101 and 102, a content stream is accessed and monitored. At step 103, work on content in the content stream is performed. Typically, the work is associated with a principal. By way of example, one type of work includes marking the content, such as highlighting, adding a note, comment or sound annotation, adding document or hyper link, and the like. For instance, using a high lighting marker to emphasize content, using a specific color of highlighting marker to emphasize content where multiple colors are used in a document, using a note feature to leave notes of explanation concerning a region of a document, etc.

During step 104, the work is evaluated and processed to determine semantic information related to the work. Each action in context with the content and the work practice being executed allows in-context tokens to be generated in step 105. Where the principal is a group, content being worked on by the group can provide even more semantics taking into account the members of the group, their primary focus, etc. Further semantics can be identified as marked content, like notes, comments and annotations, are themselves worked on.

Tokens can be generated from work performed on any content, whether it be textual, audio, visual or other. For instance, token generation can include the identifying of a object in a bitmap image. For example, a visual element in the RGB domain that is identified as an "eye." A gray scale histogram of the same "eye" region would have additional, different semantic information. The same processing can be done in other spacial domains, signal domains, etc. Sources of such domains can include any medium that can carry a signal, such as sound, visual, tactile, etc.

Figure 8:
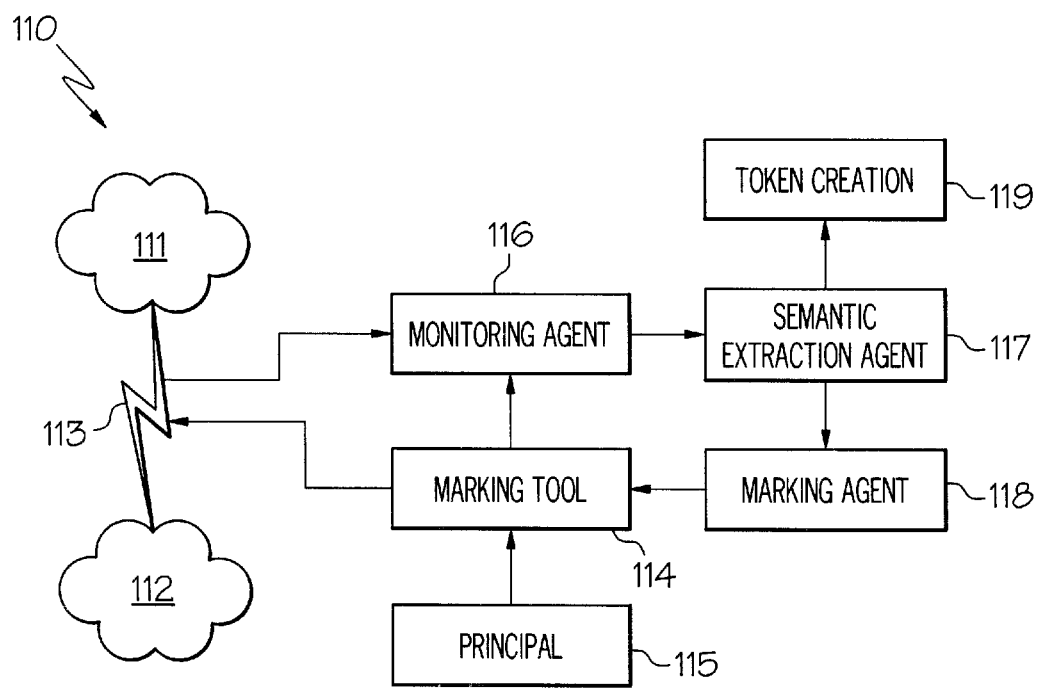
FIG. 8 depicts a system for generating tokens.

FIG. 8 depicts an example of a system 110 for generating tokens based on work to content. In use, the system 110 extracts tokens based on the marking and annotating an electronic document. Any document viewing mechanisms can be used to generate the tokens as long as the viewing technology provides some mechanism for marking (e.g., highlighting). An electronic document may comprise text, rich text, vector drawings, raster or bitmap drawings, sound, database record or set of records, meta data, etc. The resulting tokens are based on the principal's 115 markings to the electronic document based on the "locations" (virtual, mapped, or real) of the marking in view of the markings relationship to the document.

The two clouds 111, 112 represent a network that has a common connection 113 through which a content stream can be accessed. The marking tool 114 is associated with a principal 115 and is used to work on content. In this example, the work involves marking the content. The specific form of the marking tool 114 will depend on the type of content which is being marked.

The monitoring agent 116, such as a process or program having a series of instructions in a computer system, has access to the connection 113 and the content stream. The monitoring agent 116 extracts the content and markings made by the marking tool 114 for processing by the semantic extraction agent 117. Optionally, the monitoring agent 116 can additionally extract other data, such as the identity of the associated principal 115, as may be needed for later processing. The semantic extraction agent 117 then analyzes the markings to determine the associated semantic content of the markings. This information is passed to the token creation module 119, which creates the actual tokens.

In one embodiment, the tokens are defined in a semantic space. Tokens may be generated as the semantic extraction agent 117 evaluates the order (e.g., chronology of creation), locality (e.g., position within the document as defined by the semantic space), type (e.g., highlighting, notes, comments), and attributes (color, annotation type (text, marking, sound)), and the like. This evaluation may occur via real-time or from some mechanism that provides the marking information in some order that fits the semantic space (one example of this order is chronology—when the token generator is described as "watching" this refers to this mechanism). If the user/agent has a mechanism for allowing a discipline (e.g. marking schema) of the marking tool 114, usage then more semantic information may be extracted. The token creation module 119 of the system does not rely on or specify any single or group of semantic discovery/ definition mechanisms. Rather, any semantic discover/ definition mechanism that produces a token that encapsulates the semantic meta data and source material used to produce the semantic mapping may be used.

Optionally, the monitoring of the work practice of the work to define markings can produce the semantics necessary to train the marking agent 118 to perform the same marking process within some range of acceptability. For instance, if you use the semantics of the work practice to identify an eye then the marking agent 118 could "learn" that work practice and perform it with some degree of consistency. Training over time using the semantics of the work practice would refine this ability.

The following provides several examples of the method 100 and system 110 in use. Tokens can be generated without principal discipline. Assume the principal 115 is a single user/agent which is marking an electronic document. The monitoring agent 116 "watches" the user/agent usage of the marking tool 114 and the attributes of the tools. For instance, the user/agent uses yellow, green, and blue to highlight paragraphs and phrases in a text document. Each individual marking will possibly have some semantic information that can be extracted by the semantic extraction agent 117 (e.g. the nouns or a subject of the highlighted text revealed via linguistic morphology). If the marking is for a single word then the semantics may be derived from the phrase, sentence, and/or paragraph that the word is in. Further, all of the yellow markings may be combined and evaluated in a similar manner to see if various semantic mechanisms might expose concepts, summaries, topics, etc. The same would be done for green and blue. Further, notes in close proximity to a highlight (or some other marking) would be evaluated as a part of the semantic context for the particular color that is in close proximity. The token creation module 119 then creates tokens based on the extracted semantic content.

Tokens can be generated with a principal's discipline. If the user/agent can be disciplined to use a "marking schema" then the semantic content of markings and annotations become ever stronger. For instance, if the user/agent defines before applying any markings what each color means (e.g., explicit mapping to an existing semantic space, mapping to a set of keywords and/or concept words) then more semantic mechanisms can be applied intelligently to extract tokens (e.g., keywords associated with a color now become keywords lending context to the marking). Further, as a discipline is used it may be enhanced because of that use. If the discipline is mapped to a semantic store, then the semantic content of the discipline is enhanced as the semantic store is refined.

Tokens can be generated in a collaborative group. Assume no discipline exists on the part of a group of users/agents. In the case of generating tokens from a group of users/agents, locality can become very important. Since we can not rely on any discipline to define a strong context, the context can be extracted based on locality. If several users/agents have marked the same phrase then a context may be assumed between the several users/agents. Mapping the context to the various colors used by the group may yield more information. For instance, if User A used yellow where User B used green and some large percentage of the yellow and green markings are the same then we have a good case for a shared context within the set of A's yellow marking and B's green markings. Further, any other annotations (e.g., notes, comments, document links, hyperlinks) that can be associated with the yellow and green marking may be used to enhance and extend the semantic value of the markings.

Tokens can be generated in a collaborative group with partial group discipline. If some of the members of a collaborative group are disciplined, then the mechanism of marking collaborative semantic links as described above can be strengthen. Again, if A's yellow and B's green have a significant overlap and A is disciplined then B may draw from A's discipline. Tokens can also be generated in a collaborative group with full group discipline. If all members of a group are disciplined, then the semantic context and mapping become even stronger. Where high correlations are found between users/agents, stronger disciplines may be used to enhance the semantic context and mapping in weaker disciplines.

As still a further example, as a user/agent applies markings, the order may be used to discover semantics that may be used in turn to discover other semantic coupling within or without the electronic document. This can take the form of allowing the user/agent to make several passes through the document and allowing the discipline of a marking mechanism to be specified as secondary to the previous pass through the document (e.g., the first pass is bright yellow markings, the second is a lighter yellow showing a coupling to less important phrases or regions that are related to the first pass set, etc.) Evaluating the marking work process in real-time may also yield new semantic information. For example, if yellow markings were applied to a document in the order of: page 1, page 2, page 5, page 6, page 4—the page 4 may be a sub-concept or sub-context to one of the previous pages.

While some of the foregoing examples are founded upon a text or rich text documents, any other type of content may be used by applying appropriate annotation and marking mechanisms. For instance, in a bitmap the location would be two dimensional and marked phrases can refer to groups of pixels, etc. Other electronic documents may have a marking and context metric defined (e.g., database) to yield the same results. While a text or rich text document has been used to illustrate the invention one should not assume that only text or highlighting markers, etc. can be used. Any type of content that has a viewing and marking mechanism may he enhanced by the application of the invention.

The foregoing description of the preferred embodiment of the invention has been presented for purposes of illustration and description. It is not intended to be exhaustive nor to limit the invention to the precise form disclosed. Many alternatives, modifications, and variations will be apparent to those skilled in the art in light of the above teaching. Accordingly, this invention is intended to embrace all alternatives, modifications, and variations that fall within the spirit and broad scope of the amended claims.

What is claimed is:

1. A computer system for creating tokens based on markings, comprising:
   a) a network having a plurality of principals;
   b) a content stream in the network associated with at least one principal, said content stream having a plurality of phrases;
   c) a marking tool having access to the content stream, said marking tool being adapted to mark phrases in the content stream;
   d) a monitoring agent having access to the content stream, said monitoring agent being operative to extract the markings; and
   e) a token creation module being operative to create tokens based on the extracted markings.

2. A computer system as recited in claim 1, further comprising a semantic extraction agent being operative to determine semantic content from the extracted markings.

3. A computer system as recited in claim 1, further comprising an agent being operative to direct the marking tool to mark additional phrases in conformance with the extracted markings.

4. A computer system as recited in claim 1, further comprising a plurality of profiles each associated with one or more tokens, and one or more semantic records each associated with a profile and a principal.

5. A method in a computer system for generating tokens based on marked phrases, the method comprising the steps of:
   a) accessing a content stream having a plurality of phrases;
   b) marking one or more phrases in the content stream;
   c) extracting the marked one or more phrases;
   d) processing the marked one or more phrases to determine semantic information; and
   e) creating a token based on the semantic information.

6. A method as recited in claim 5, wherein the step of marking comprises annotating one or more phrases.

7. A method as recited in claim 5, wherein the step of marking comprises highlighting one or more phrases.

8. A method as recited in claim 5, wherein the step of marking comprises using discipline.

9. A method as recited in claim 5, wherein the step of processing comprises evaluating the chronological order of marking.

10. A method as recited in claim 5, wherein the step of processing comprises evaluating the locality of the marking in a semantic space.

11. A method as recited in claim 5, wherein the step of processing comprises evaluating the type of marking.

12. A method as recited in claim 5, wherein the step of processing comprises evaluating the attributes of the marking.

13. A method as recited in claim 5, further comprising the steps of:
   f) associating one or more profiles with the token; and
   g) representing at least a portion of the content stream in a semantic space corresponding to one or more profiles.

14. A method as recited in claim 5, further comprising the steps of:

f) associating one or more profiles with the token;

g) instantiating a semantic record from the profiles; and h) comparing the semantic record with other semantic records.

15. A computer readable medium comprising instructions for performing the method recited in claim 5.

16. A computer system comprising a processor for receiving and executing the instructions from the computer readable medium recited in claim 15.

17. A computer system for creating a token based on marked phrases, comprising:

a) means for accessing a content stream having a plurality of phrases;

b) means for monitoring the content stream;

c) means for marking one or more phrases in the content stream;

d) means for processing the marked one or more phrases to determine semantic information; and e) means for creating a token based on the extracted semantic information.

18. A computer system as recited in claim 17, further comprising means for using the created token.

* * * * *